(12) United States Patent
Mikasa et al.

(10) Patent No.: US 6,612,593 B2
(45) Date of Patent: Sep. 2, 2003

(54) SUSPENSION STRUCTURE

(75) Inventors: Tetsuo Mikasa, Wako (JP); Tsutomu Ogawa, Wako (JP); Nobuo Kubo, Wako (JP); Fumiaki Fukuchi, Wako (JP); Haruyuki Iwasaki, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/985,018

(22) Filed: Nov. 1, 2001

(65) Prior Publication Data

US 2002/0050694 A1 May 2, 2002

(30) Foreign Application Priority Data

Nov. 1, 2000 (JP) ........................................ 2000-334613

(51) Int. Cl.⁷ ................................................ B60G 7/02
(52) U.S. Cl. .............................. 280/86.758; 280/86.75; 280/124.134; 280/124.135; 280/124.136
(58) Field of Search .................... 280/86.75, 86.758, 280/124.134, 124.135, 124.136, 124.14, FOR 111, FOR 112

(56) References Cited

U.S. PATENT DOCUMENTS

| 3,893,701 A | * | 7/1975 | Kroniger | |
|---|---|---|---|---|
| 5,516,130 A | * | 5/1996 | Mitchell | 280/124.134 |
| 5,607,177 A | * | 3/1997 | Kato | 280/124.134 |
| 6,241,267 B1 | * | 6/2001 | Dziadosz et al. | 280/124.134 |

FOREIGN PATENT DOCUMENTS

| DE | 3827854 | 12/1989 |
|---|---|---|
| DE | 195 42 496 | 10/1996 |
| DE | 199 11 121 | 9/1999 |
| DE | 199 22 800 | 11/1999 |
| JP | 06340274 A | 12/1994 |
| JP | 09066718 A | 3/1997 |

OTHER PUBLICATIONS

Patent Abstract of Japan of 04224411, published Aug. 13, 1992.
Patent Abstract of Japan of 06340274A, published Dec. 13, 1994.
Patent Abstract of Japan of 9066718, published Mar. 11, 1997.

* cited by examiner

Primary Examiner—Eric Culbreth
(74) Attorney, Agent, or Firm—Arent Fox Kintner Plotkin & Kahn PLLC

(57) ABSTRACT

A suspension structure includes a subframe and a suspension arm. The suspension structure has strength lower than that of the subframe. When an excessive external force acts from a road surface on a wheel, the suspension arm is deformed before the subframe is, thereby preventing the excessive external force from directly acting on the subframe.

2 Claims, 3 Drawing Sheets

SUSPENSION STRUCTURE

FIELD OF THE INVENTION

The present invention relates to an improved suspension structure for preventing an excessive external force from acting on die-cast subframes.

BACKGROUND OF THE INVENTION

A known structure in which a subframe is mounted to the bottom of a floor panel serving as a component of a vehicle body, and a suspension arm assembly is mounted to the subframe, is disclosed, for example, in Japanese Patent Laid-Open Publication No. HEI-9-66718, "Mounting Structure for Automobile Suspension Member," or in Japanese Patent Laid-open Publication No. HEI-6-340274, "Vehicle Suspension Cross Member".

HEI-9-66718 describes a structure comprising a second member having a hole and being mounted to a vehicle body, and a first member having a protruding portion and being mounted to a suspension member serving as a subframe, the first and second members being fixed to each other via a fastener with the protruding portion inserted into the hole, thereby mounting the suspension arm assembly to the suspension member.

When an excessive external force acts on the suspension arm through a wheel of the vehicle, for example, force is transmitted to the suspension member, breaking the fastener, causing the protruding portion of the first member to slip out of the hole of the second member, and thereby detaching the suspension member from the vehicle body.

HEI-6-340274 describes an integrally-molded aluminum alloy suspension cross member serving as a subframe, which has a body, a wing-shaped portion and a plurality of vehicle body mounting members on each side of the body, and an arm supporting member for supporting a suspension arm assembly at the end of each wing-shaped portion.

In HEI-9-66718, it is conceived that an excessive external force acting on the suspension member would cause the suspension member to be detached from the vehicle body, thereby adversely affecting the steering of the automobile.

In HEI-6-340274, even if the suspension cross member has a strength enough for normal operation, it is presumed that an excessive external force applied from the suspension arm assembly to the suspension cross member cannot be sustained by the suspension cross member with such a strength and the suspension arm assembly, adversely affecting the steering of the vehicle as was the case with HEI-9-66718.

SUMMARY OF THE INVENTION

It is therefore an object of the present invention to provide a suspension structure designed to prevent an excessive external force from acting on a die-cast subframe.

According to an aspect of the present invention, there is provided a suspension structure which comprises a subframe designed to be mounted to a floor panel, and a suspension arm assembly mounted to the subframe vertically movably, wherein the subframe is die-cast of aluminum alloy, and the suspension arm assembly has strength lower than that of the subframe.

When an excessive force acts from the road surface on the wheel, for example, the suspension arm assembly is deformed before the aluminum alloy die-cast subframe is. Thus the suspension arm assembly mitigates the excessive force, preventing the aluminum alloy die-cast subframe from being affected by the excessive force.

The suspension arm assembly preferably comprises a toe control arm and other components; and the toe control arm preferably has a strength lower than those of the other components, so that the suspension arm assembly has a strength lower than that of the subframe. With respect to the excessive force applied from the wheel to the components of the suspension arm assembly, the toe control arm is deformed before the other components are, protecting the other components.

The toe control arm is preferably of a forged material. When an external force acts on the suspension arm assembly through the wheel, the toe control arm is deformed but not broken.

BRIEF DESCRIPTION OF THE DRAWINGS

Certain preferred embodiments of the present invention will be described below, by way of example only, with reference to the accompanying drawings, in which.

DETAILED DESCRIPTION OF THE PREFERRED EMBODIMENTS

The following description is merely exemplary in nature and is in no way intended to limit the invention, its application or uses.

Figure 1:
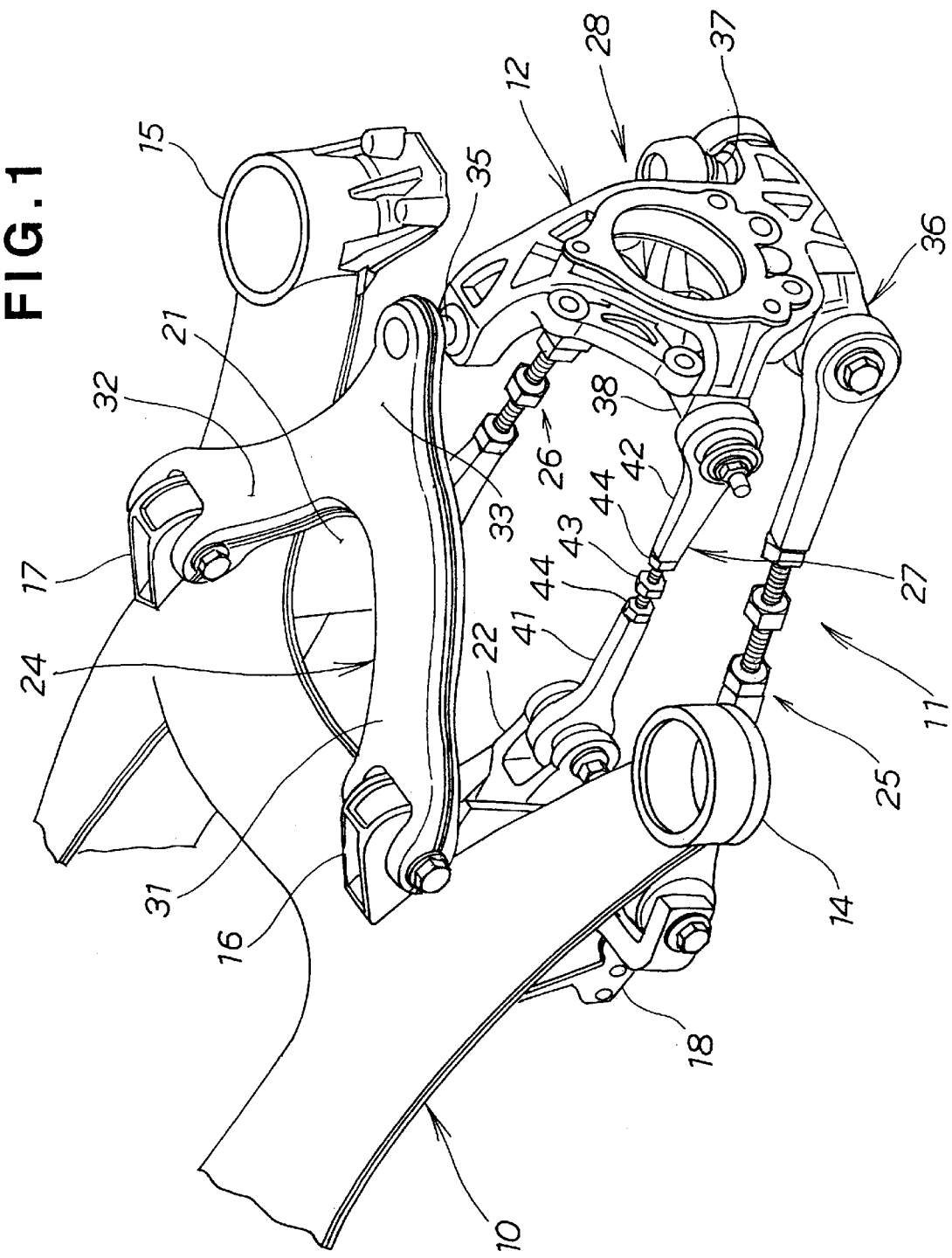
FIG. 1 is a perspective view showing a die-cast subframe and a suspension structure according to the present invention.

FIG. 1 shows a structure in which a subframe 10 extending in a transverse direction of a vehicle is attached to a floor panel serving as a component of a vehicle body, a suspension arm assembly 11 is mounted to the subframe 10 in a vertically movable manner, and knuckle 12 serving as an axle supporting member is attached to the suspension arm assembly 11. An axle shaft is mounted to the knuckle 12. A wheel is rotatably mounted to the axle shaft via a hub.

FIG. 1 shows only part of the structure of the subframe 10, suspension arm assembly 11 and knuckle 12 from one lateral side. The subframe 10, suspension arm assembly 11 and knuckle 12 have a symmetrical structure.

The subframe 10 is die-cast from aluminum alloy and is a member shaped like a ladder in a plan view, having vehicle body mounting parts 14, 15 for mounting to the floor panel, and upper mounting parts 16, 17 and lower mounting parts 18, 21, 22 for mounting the suspension arm assembly 11.

The suspension arm assembly 11 has an upper arm 24 attached to the upper mounting parts 16, 17 of the subframe 10 in a vertically rotatable manner, a first lower arm 25 and a second lower arm 26 attached to the lower mounting parts 18, 21, respectively, in a vertically rotatable manner, and a toe control arm 27 attached to the lower mounting part 22 in a vertically rotatable manner. The suspension arm assembly 11 has such a mechanism for hanging a rear wheel, for example, and constitutes a rear suspension 28 with the knuckle 12.

The upper arm 24 has a first arm 31, a second arm 32, and a third arm 33. The first and second arms 31, 32 are attached to the upper mounting parts 16, 17, respectively. The third arm 33 is attached to a first mounting part 35 of the knuckle 12.

The first lower arm 25 is attached at one end to the lower mounting part 18 and at the other end to a second mounting part 36 of the knuckle 12.

The second lower arm 26 is attached at one end to the lower mounting part 21 and at the other end to a third mounting part 37 of the knuckle 12.

The toe control arm 27 is attached at one end to the lower mounting part 22 and at the other end to a fourth mounting part 38 provided at the side of the knuckle 12. The toe control arm 27 has separate arm halves 41, 42, an adjusting bolt 43 connecting the arm halves 41, 42 to each other, and locking nuts 44, 44 fixing the adjusting bolt 43 and the arm halves 41, 42, to allow fine adjustment of the toe angle of the wheel and maintain the finely adjusted toe angle.

The toe control arm 27 is, for example, of a forged aluminum alloy material and has a small sectional area so as to have a lower strength than the other components of the suspension arm assembly 11, i.e., the upper arm 24 and first and second lower arms 25, 26, and than the subframe 10.

Figure 2:
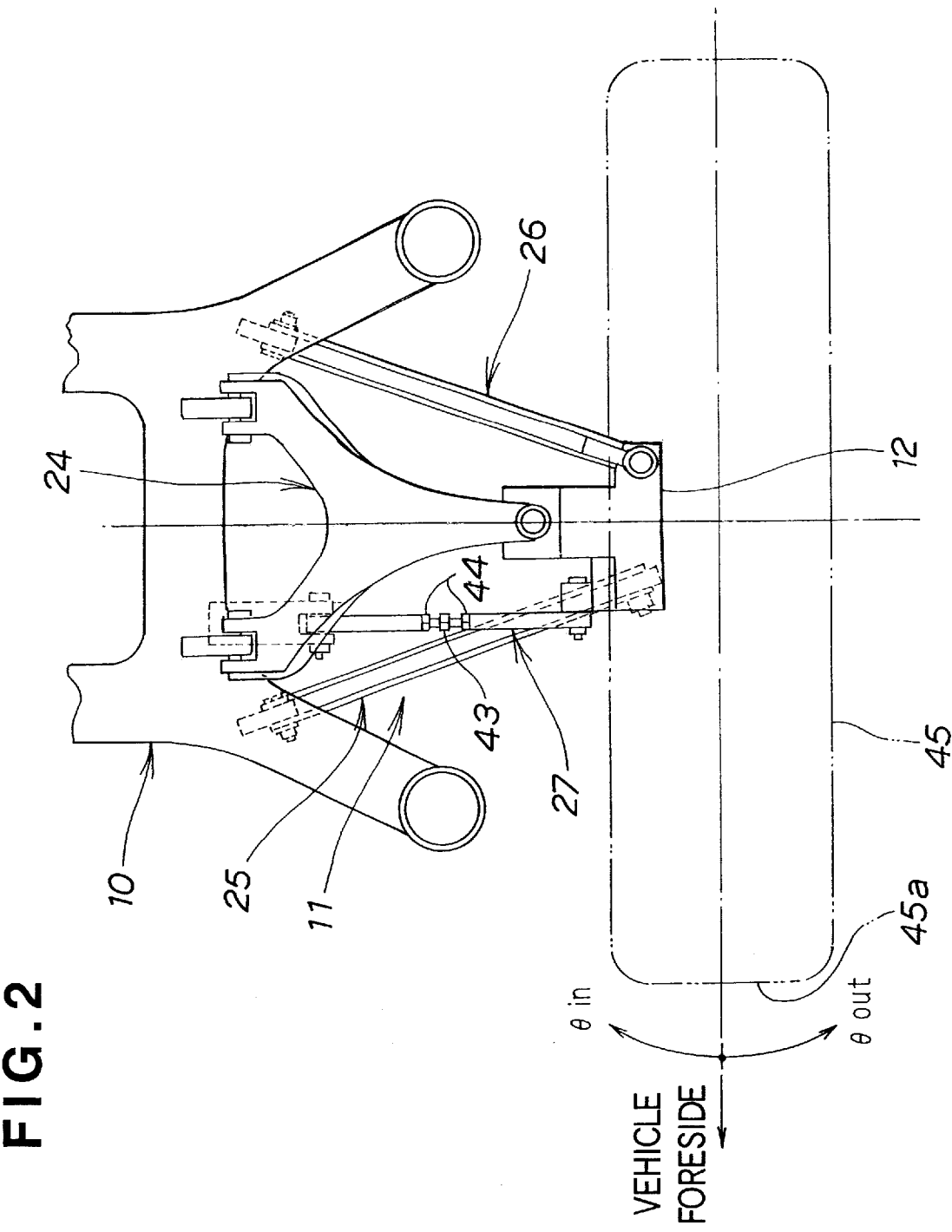
FIG. 2 is a plan view showing the die-cast subframe and the suspension structure shown in FIG. 1.

FIG. 2 is a plan view showing the die-cast subframe and the suspension structure according to the present invention.

A wheel 45 is positioned using the upper arm 24 and the first and second lower arms 25,26 of the suspension arm assembly 11. The toe control arm 27 is used to finely adjust the toe angle of the wheel.

When finely adjusting the toe angle, the locking nuts 44, 44 are first loosened, and the adjusting bolt 43 is rotated to change the total length of the toe control arm 27, thereby obtaining the desired toe angle. Thereafter, the locking nuts 44, 44 are fastened with the adjusting bolt 43 held and prevented from rotating. If the total length of the toe control arm 27 is set lower, a front portion 45a of the wheel 45 inclines inward toward the vehicle, i.e., to the θin side, and the wheel 45 has toe-in. In contrast, if the total length of the toe control arm 27 is set higher, the front portion 45a of the wheel 45 inclines toward the outside of the vehicle, i.e., to the θout side, and the wheel 45 has toe-out.

The toe angle of the wheel 45 effects the steering properties of the vehicle during cornering, for example. Proper adjustment of the toe angle provides mild understeering with which the driver can easily correct the advancing direction (the vehicle tends to deviate outside of the path of circular motion).

Now the function of the suspension arm assembly 11 as described above is described with reference to FIGS. 3 and 4.

Figure 3:
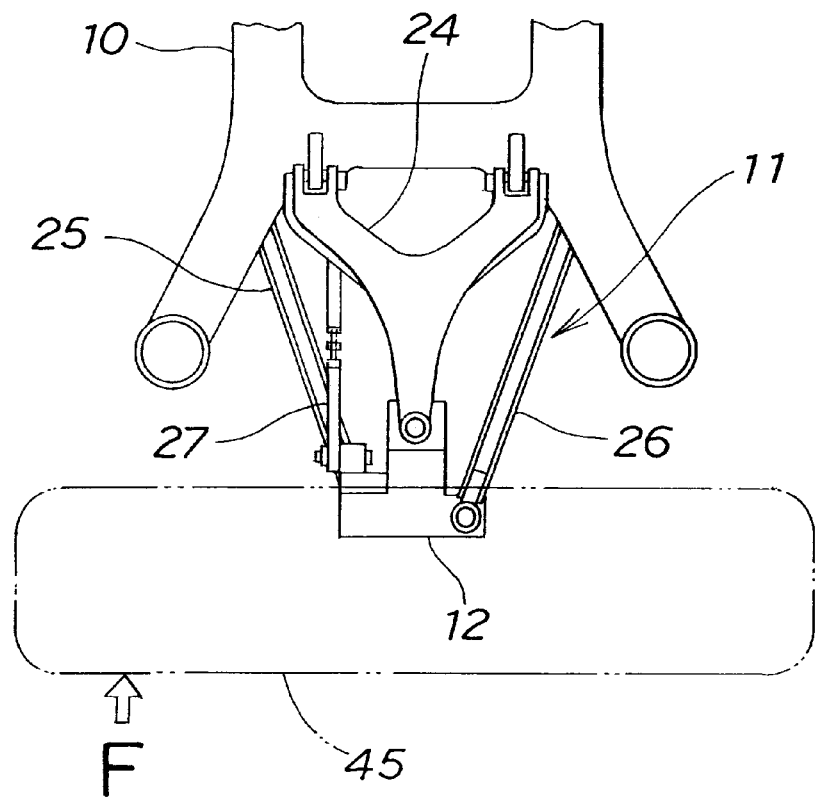
FIG. 3 is a plan view illustrating the function of a suspension arm assembly when an external force acts on a wheel.

In FIG. 3, an excessive external force F as shown by an arrow acts on a forward portion of the outer side of the wheel 45, for example, and the external force F is transmitted from the wheel 45 through the knuckle 12 to the suspension arm assembly 11.

Figure 4:
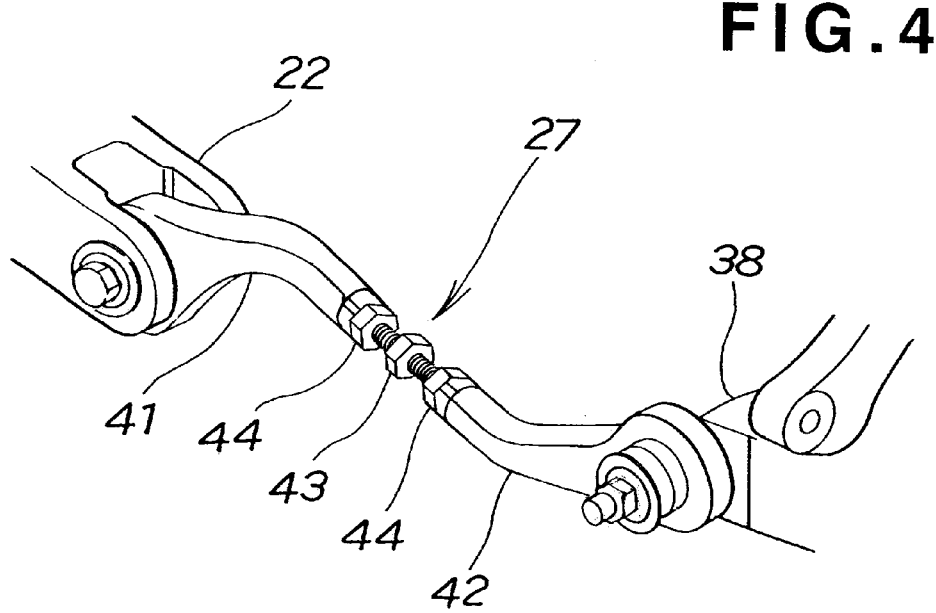
FIG. 4 is a perspective view showing a toe control arm.

In FIG. 4, the excessive external force transmitted to the suspension arm assembly 11 compresses and deforms the toe control arm 27 with the lowest strength among the components of the suspension arm assembly. Since the toe control arm 27 is of a forged material of high toughness, it is not more severely damaged or broken.

The deformation of the toe control arm 27 changes the toe angle of the wheel. This, however, only changes the feel of the steering, that is, provides less mild understeering or neutral steering (with which the vehicle tends to trace the path of circular motion).

As illustrated in FIGS. 1 and 3, in the structure of the rear suspension 28, for example, where the subframe 10 is mounted to a floor panel, the knuckle 12 is attached to the subframe 10 via the suspension arm assembly 11 in a vertically movable manner, and the wheel 45 is rotatably attached to the knuckle 12 via an axle shaft, the subframe 10 is die-cast of aluminum alloy and the suspension arm assembly 11 has a lower strength than the aluminum alloy die-cast subframe 10. When an excessive force F acts from the road surface on the wheel 45, for example, the suspension arm assembly 11 is deformed before the aluminum alloy die-cast-subframe 10 is, mitigating the excessive force F, thereby preventing the aluminum alloy die-cast subframe 10 from being affected by the excessive force.

Further, in the present invention, the toe control arm 27 has a strength lower than the other components of the suspension arm assembly 11 so as to weaken the suspension arm assembly 11 in strength. With respect to the excessive force F to the components of the of the suspension arm assembly 11 from the wheel 45, the toe control arm 27 is deformed before the other components are, so that the other components, being the upper arm 24 and the first and second lower arms 25, 26, are protected.

The above embodiment of the present invention is described with respect to rear suspension. The description is not intended to be limiting. The present invention can be applied to front suspension in which a suspension arm assembly has a strength lower than that of a subframe.

Obviously, various minor changes and modifications of the present invention are possible in the light of the above teaching. It is therefore to be understood that within the scope of the appended claims, the invention may be practiced otherwise than as specifically described.

The present disclosure relates to the subject matter of Japanese Patent Application No. 2000-334613, filed Nov. 1, 2000, the disclosure of which is incorporated herein by reference in its entirety.

What is claimed is:

1. A suspension structure comprising:

a subframe designed to be mounted to a floor panel; and a suspension arm assembly mounted to said subframe vertically movably, said subframe being die-cast from an aluminum alloy material, said suspension arm assembly having strength lower than that of said subframe;

wherein said suspension arm assembly comprises a toe control arm and other components, and said toe control arm has strength lower than those of said other components so that said suspension arm assembly has strength lower than that of said subframe.

2. A suspension structure as set forth in claim 1, wherein said toe control arm is of a forged material.

* * * * *